United States Patent [19]

Boothroyd et al.

[11] Patent Number: 4,620,274
[45] Date of Patent: Oct. 28, 1986

[54] DATA AVAILABLE INDICATOR FOR AN EXHAUSTED OPERAND STRING

[75] Inventors: Donald C. Boothroyd, Phoenix; Robert W. Norman, Jr., Glendale, both of Ariz.

[73] Assignee: Honeywell Information Systems Inc., Phoenix, Ariz.

[21] Appl. No.: 481,227

[22] Filed: Apr. 1, 1983

[51] Int. Cl.⁴ .............................................. G06F 9/34
[52] U.S. Cl. ................................................... 364/200
[58] Field of Search ........................ 364/200 MS File

[56] References Cited

U.S. PATENT DOCUMENTS

| | | | |
|---|---|---|---|
| 3,878,513 | 4/1975 | Werner | 364/200 |
| 4,084,229 | 4/1978 | Taylor et al. | 364/200 |
| 4,138,720 | 2/1979 | Chu et al. | 364/200 |
| 4,156,910 | 5/1979 | Barton et al. | 364/200 |
| 4,159,517 | 6/1979 | Paradine et al. | 364/200 |
| 4,315,312 | 2/1982 | Schmidt | 364/200 |
| 4,399,507 | 8/1983 | Cosgrove et al. | 364/200 |

Primary Examiner—Thomas M. Heckler
Attorney, Agent, or Firm—A. A. Sapelli; J. S. Solakian; A. Medved

[57] ABSTRACT

The present invention relates to an apparatus for providing a data available indication while inhibiting the reading of operand data beyond the last word of an operand data string. The data available indication operates to enable additional cycles to be generated for completing the execution of the instruction. The apparatus includes a memory element, which has a plurality of locations, each of the plurality of locations corresponding to a respective location of a memory device where the operand data string is stored. The memory element stores information which indicates when the corresponding location is the last word of the operand data string. A read address register which contains the read address value of the memory device includes an input strobe terminal which receives an enable signal based on the information stored in the memory element, thereby enabling or inhibiting the updating of the read address value in the read address register.

4 Claims, 12 Drawing Figures

FIG. I

FIG. 3
DATA WORD FORMATS
A. 9-BIT CHARACTER FORMAT
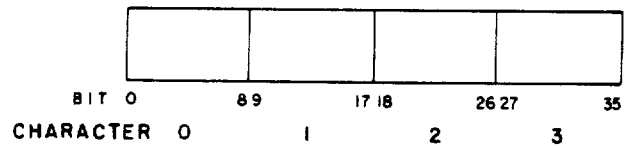
B. 4-BIT CHARACTER FORMAT
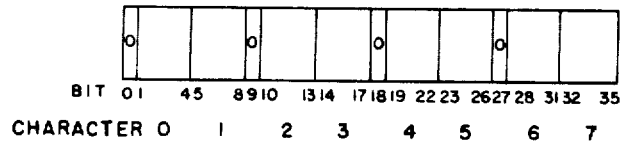
C. 6-BIT CHARACTER FORMAT
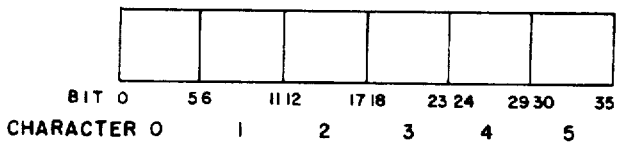
FIG. 4
A.
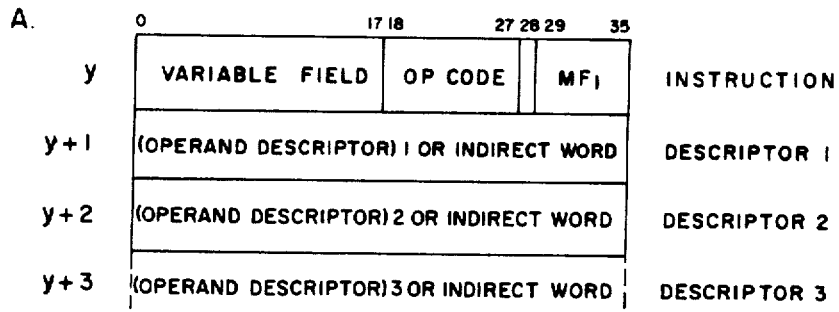
B. BIT STRING OPERAND DESCRIPTOR FORMAT
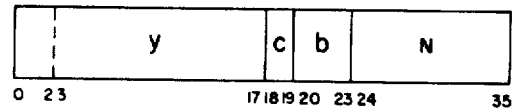
C. ALPHANUMERIC OPERAND DESCRIPTOR FORMAT
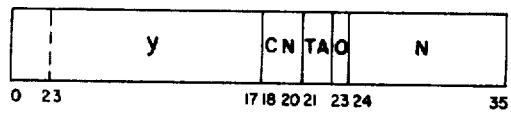
D. NUMERIC OPERAND DESCRIPTOR FORMAT
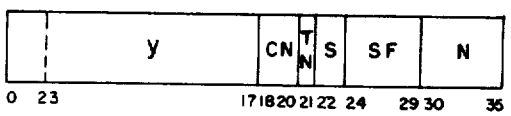

FIG. 8

DATA AVAILABLE INDICATOR FOR AN EXHAUSTED OPERAND STRING

RELATED PATENT APPLICATIONS

The present patent application is related to the following U.S. patent applications and U.S. Patent, which are assigned to Honeywell Information System Inc., the assignee of the present application, all of the references listed below being incorporated by reference herein, to the extent necessary for an understanding of the present invention.

1. Apparatus for Aligning and Packing a First Operand Into a Second Operand of a Different Character Size, by Donald C. Boothroyd et al, Ser. No. 394,952, filed on July 2, 1982;

2. Data Alignment Circuit, by Donald C. Boothroyd et al, Ser. No. 394,951 filed on July 2, 1982;

3. Collector, by R. Guenthner, G. Edington, L. Trubisky, and J. Circello, Ser. No. 434,129, filed Oct. 13, 1982;

4. A Pipelined Decimal Character Execution Unit, by Donald C. Boothroyd et al, Ser. No. 481,224, filed on even date herewith;

5. Apparatus for Detecting a Predetermined Character of a Data String, by Donald C. Boothroyd et al, Ser. No. 481,226, filed on even date herewith;

6. Method for Decreasing Execution Time of Numeric Instructions, by Donald C. Boothroyd et al, Ser. No. 481,202, filed on even date herewith;

7. Apparatus for Forward or Reverse Reading of Multiple Variable Length Operands, by Donald C. Boothroyd et al, Ser. No. 481,225, filed on even date herewith;

8. U.S. Pat. No. 4,268,909, entitled "Numeric Data Fetch-Alignment of Data Including Scale Factor Difference", by Kindell et al.

9. Wraparound Buffer for Repetitive Decimal Numeric Operations, by Donald C. Boothroyd et al, Ser. No. 481,228, filed on even date herewith.

BACKGROUND OF THE INVENTION

This invention relates to the operational control of a digital computer system, and more particularly, to the digital logic circuitry for indicating the end of an operand data string stored in a temporary storage memory, wherein the operand data string can be multiple variable length operands.

An objective, which almost always faces designers furthering the advancement of digital computers, is to decrease the time required for executing each of the instructions executed by the digital computer, thereby decreasing the overall time required by the digital computer to perform a predefined task and increasing the efficiency of the digital computer. Many schemes have been devised by digital computer designers in an attempt to meet this objective. In the execution of some instructions, the operand data stored in temporary storage memory must be read. The temporary storage memory has associated therewith, a read address register which contains a read address value specifying a location of the temporary storage memory to be read. Although the reading of the operand data requires some number of cycles, the storing of the resulting data may require more cycles than were required for the reading of the operand data. An example of such an operation is when two words are to be read and a move, or shift, operation of less than a full word (or double word) is performed. The results of the operation require three write operations into a results stack, since part of the second word is shifted to a third word. During the additional cycle (or cycles) it is desirable to freeze the read address value contained in the read address register to prevent reading data associated with a subsequent instruction. The data available indicator of the present invention generates a signal which freezes the contents of the read address register when the end of the operand data string is detected, i.e., the signal inhibits the read address value from any further changes and permits additional cycles to be generated for completing the execution of the instruction.

SUMMARY OF THE INVENTION

Therefore, there is provided by the present invention, an apparatus for providing a data available indication which allows additional cycles to be generated for completing the execution of an instruction while inhibiting the reading of operand data beyond the last word of an operand data string, wherein the operand data string is stored in a memory device, and wherein the operand data string includes multiple variable length operand data. The apparatus of the present invention includes a memory element, which has a plurality of locations, each of the plurality of locations corresponding to a respective location of the memory device, which stores information to indicate when the corresponding location is the last word of the operand data string. The apparatus also includes a register element for holding a read address value of the memory device. The register element has an input adapted to receive the read address value and has an output operatively connected to the memory device. The register element further has a strobe input terminal adapted to receive a first enable signal to enable receipt of the read address value into the register means.

Accordingly, it is an object of the present invention to provide an apparatus for detecting the end of the data string.

It is still another object of the present invention to provide an apparatus for freezing the read address value to the location which is the last location of the data string.

It is still another object of the present invention to provide an apparatus for preventing data to be read which is associated with a subsequent instruction.

It is still another object of the present invention to provide a data available indicator thereby enabling additional cycles for completing the execution of the instruction.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 3 shows a plurality of data word formats of the central processing unit;

FIG. 4 shows the instruction word and descriptor word formats of the computer word of the central processing unit having a system configuration utilizing a plurality of execution units, including a decimal character unit;

FIG. 8 shows a format of the decimal character unit instruction and descriptor words;

DETAILED DESCRIPTION

Figure 1:
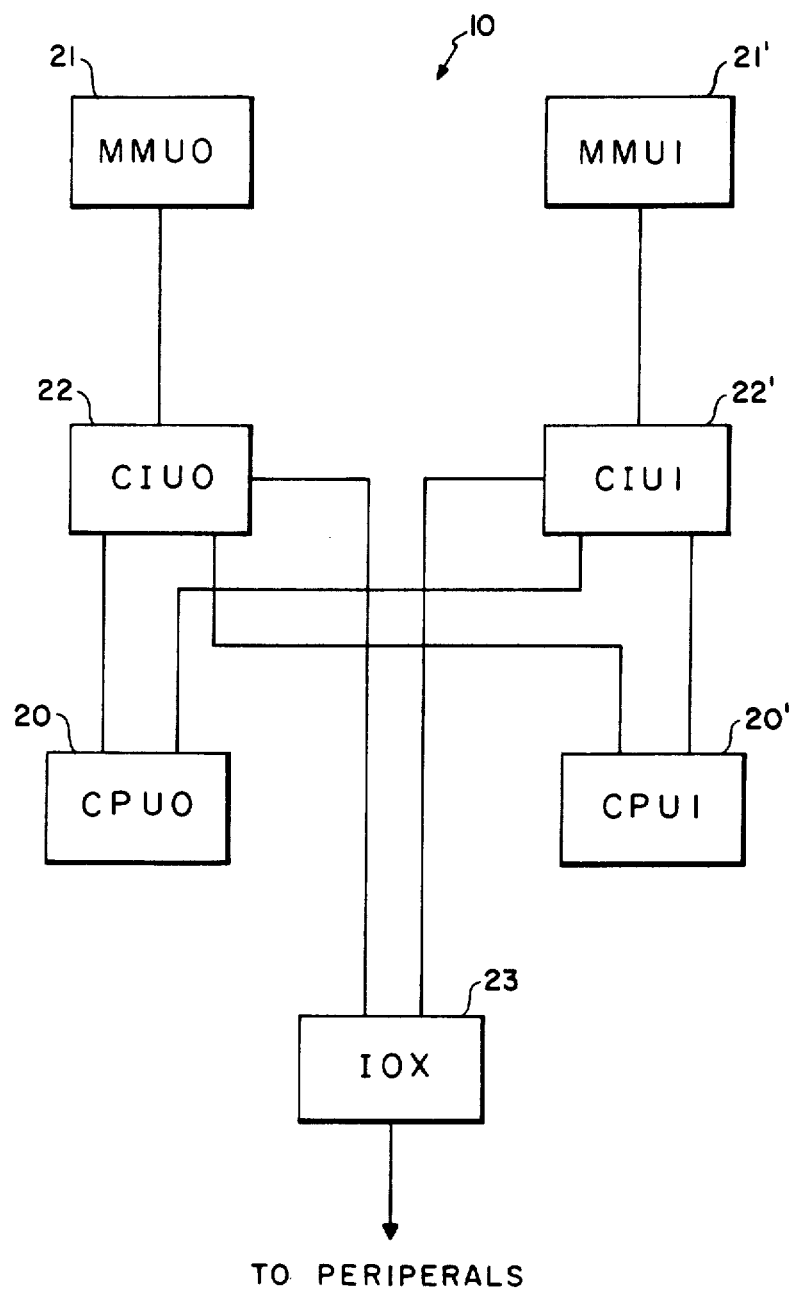
FIG. 1 shows a block diagram of a data processing system having a plurality of modules, including a central processing unit.

The present invention finds particular application in a decimal character execution unit for executing a predetermined class of instructions, namely decimal arithmetic and character operations. Before describing the present invention, it will be helpful to understand its operating environment, which will now be described. Referring to FIG. 1, a central processing unit (CPU) is shown as a module of a data processing system (DPS) 10. A first central processing unit (CPU 0) 20 and a second central processing unit (CPU 1) 20' comprise the CPU modules of DPS 10, each having full program execution capability and performing the actual information processing of the data processing system 10. CPU 0 20 and CPU 1 20' are each operatively connected to a first main memory unit (MMU0) 21 and a second main memory unit (MMU1) 21', through a first central interface unit (CIU 0) 22 and a second central interface unit (CIU 1) 22', respectively. MMU 0 and MMU 1 store programs and data utilized by CPU 0 and CPU 1. CIU 0 and CIU 1 act as the memory managers for the respective memories. CIU 0 and CIU 1 are each connected to an input/output multiplexer (IOX) 23 which provides an interface between the MMU and the various system peripherals. All CPU communication and interaction with other system modules is via the CIU. The DPS 10 of FIG. 1 shows a two CPU/two CIU configuration. It will be understood by those skilled in the art that various configurations are possible, including a single CIU/CPU configuration.

Figure 2:
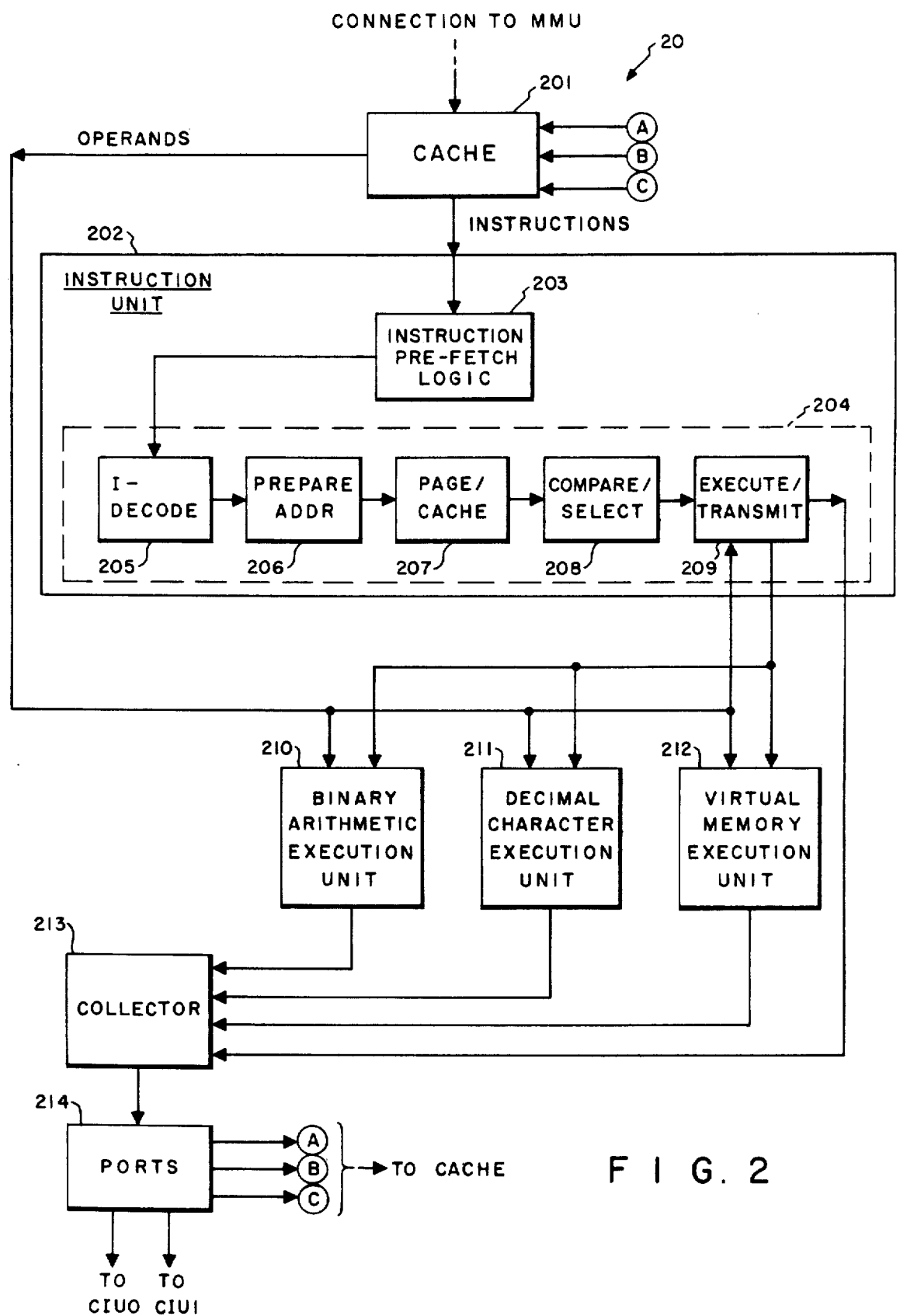
FIG. 2 shows a block diagram of the central processing unit in which a decimal character unit can be found.

Referring to FIG. 2, there is shown a block diagram of the preferred embodiment of the CPU 20 in which the present invention may be found. A cache memory (or more simply cache) 201 is provided for storing small blocks of words read from the main memory unit 21. The small blocks of words stored in cache 201 contain some instruction words and data words (or operand words) which will presently be executed and operated on by the execution units of CPU 20. An instruction unit 202 is included which comprises an instruction prefetch logic 203 and an instruction execution pipeline 204. The instruction prefetch logic 203 provides the instruction execution pipeline 204 with a supply of instructions to be executed. This is accomplished by including logic to predict the instruction sequence, prefetching instruction words from the cache memory 201, and storing them within the instruction prefetch logic block 203. The instruction execution pipeline 204 (also referred to herein as a central unit pipeline structure (CUPS)) performs the steps required for the execution of an instruction in individual stages. The first stage (I-DECODE) 205 receives the instruction to be executed from the instruction prefetch logic 203 and decodes the instruction. The second stage (Prepare Address) 206 prepares the virtual address. The third stage (Page/Cache) 207 performs a paging operation of the operand address and cache directory lookup. The fourth stage (Compare/Select) 208 initiates an operand access from cache 201 or from the main memory unit 21 in the case of a cache miss. The fifth stage (Execute/Transmit) 209 performs the actual execution of the instruction or dispatches information to an appropriate execution unit for execution.

In the preferred embodiment of the CPU, while all instructions must pass through all five stages of the central unit pipeline structure 204, not all instructions are fully executed in the fifth stage 209 of the pipeline. Some instructions are transmitted to other execution units outside the central unit pipeline structure 204, while the central unit pipeline structure 204 continues execution of succeeding instructions. The fifth stage 209 includes a basic operations execution unit (not shown) and central execution unit (not shown). The basic operations execution unit (not shown) performs the execution of those predetermined instructions which may be classified as basic operations. These are mostly very simple instructions requiring one or two cycles, including fixed point arithmetic (except multiply and divide), boolean operations, fixed point comparisons, register loads and shift operations. The central execution unit (not shown) executes a different set of predetermined instructions which refer to other instructions, move the contents of address registers or address related quantities between registers and storage, or alter processor stages.

Three additional instruction execution units are provided outside the central unit pipeline structure 204. A binary arithmetic execution unit 210 (BINAU) performs the execution of both binary and hexadecimal arithmetic operations and a fixed point multiply and divide. A decimal character execution unit (DECCU) 211 executes instructions involving decimal arithmetic, move and translate operations, character manipulations and binary string operations. The virtual memory execution unit (VMSM) 212 performs the execution of many privileged instructions including segment descriptor register manipulation, and handling fault and interrupt situations which manipulate the respective fault and interrupt registers. Each of the aforementioned execution units receives operands from the cache 201, and instructions (or commands) and descriptors from logic (not shown) of the fifth stage 209. Further, each execution unit usually operates independently of any activity occurring in the other execution units.

A collector execution unit, or more simply collector, 213 is the execution unit for most store instructions and is also the final execution unit involved in all other instructions. The collector 213 retrieves results from various results stacks of the other execution units, and updates cache 201 through a ports unit 214. The collector 213 also keeps a master copy of all program visible registers (not shown). The collector 213 permits the execution units to generate results independently and at different rates of speed, then updates the respective registers and cache in the original program sequence. The collector is more fully described in U.S. patent application Ser. No. 434,129 filed Oct. 13, 1982, entitled "Collector" by R. Guenthner, G. Edington, L. Trubisky, and J. Circello, assigned to the same assignee as the present application, the aforementioned application being incorporated by reference herein to the extent necessary for an understanding of the present invention. The ports unit 214 handles the CIU/CPU command interface processing, and the hierarchy control communication, i.e., the CIU/CPU memory hierarchy.

Although the preferred embodiment of the CPU 20 described above includes among its features paging, a 5-stage pipeline, instruction prefetch, virtual addressing, etc., it will be understood by those skilled in the art that the architecture of the DPS 10 or the CPU 20 described above is in no way intended to limit the decimal character execution unit 211 (or more simply decimal character unit) or to limit the present invention incorporated into the decimal character unit.

Referring to FIG. 3, there is shown a 36-bit computer word of the preferred embodiment having a nine-bit character format, a four-bit character format, and a six-bit character format. The nine-bit character format (FIG. 3A) utilizes 9 bits to define a character, bits 0–8, 9–17, 18–26, and 27–35 defining characters 0, 1, 2 and 3, respectively. The four-bit character format (FIG. 3B) utilizes four bits to define a character, bits 1–4, 5–8, 10–13, 14–17, 19–22, 23–26, 28–31, and 32–35, defining characters 0, 1, 2, 3, 4, 5, 6 and 7, respectively. Characters 0 and 1 of the four-bit character format are defined by dividing character 0 of the nine-bit character format in half. The remaining bit assigned to the high order bit (i.e., the left most bit as shown in the figure), bit 0, is essentially a "don't care" or "irregular" bit. Likewise, characters 2 and 3, 4 and 5, and 6 and 7, of the four-bit character format is defined by dividing characters 1, 2, and 3 of the nine-bit character format, respectively, in half. The high order bit, or don't care bit, of the four-bit character format word, bits 0, 9, 18 and 27 can always be set to zero. The six-bit character format (FIG. 1C) utilizes 6 bits to define a character, bits 0–5, 6–11, 12–17, 18–23, 24–29, and 30–35 defining characters 0, 1, 2, 3, 4, and 5 respectively. Four additional bits in both the 9 and 4 bit character formats $P_0$, $P_1$, $P_2$, and $P_3$, can be carried along as the parity bits of respective characters. The "don't care" bit of the four-bit character bit is utilized, in the preferred embodiment, as a parity bit, and will be described in detail hereinunder.

FIG. 4A shows the computer instruction format of the preferred embodiment. The instruction word is the first word of the grouping and resides in the main memory unit 21 of the DPS 10 at a location Y. Up to three operand descriptor words, or simply descriptor words, reside in contiguous locations Y+1, Y+2, and Y+3, the number of descriptor words being determined by the particular instruction word. The instruction word contains the operation code, OP CODE, which defines the operation to be performed by the CPU. A second field $MF_1$ is the modification field which describes the address modification that is performed for descriptor 1. A third field, the Variable Field, contains additional information concerning the operation to be performed and will differ from instruction to instruction. When descriptors 2 and 3 are present, the Variable Field will contain information to describe the address modification to be performed on these operands. The descriptor words can be either the operand descriptor or an indirect word which points to the operand descriptor.

The operand descriptors which describe the data to be used in the operation, and provide the address for obtaining it from the main memory unit 21 are shown in FIGS. 4B, 4C, and 4D. A different operand descriptor format is required for each of the three data types, the three data types comprising the bit string, alphanumeric, and numeric types. The field denoted Y defines the original data word address, C defines the original character position within a word of nine bit characters, B defines the original bit position within a 9 bit character, and N defines either the number of characters or bits in the data string or a 4-bit code which specifies a register that contains the number of characters or bits. CN defines the original character number within the data word referenced by the data word address. TA defines the code that defines which type alpha-numeric characters are in the data, i.e., 9 bit, 6 bit, or 4 bit. TN defines a code which defines which type numeric characters are specified, i.e., 9 bit or 4 bit. S defines the sign and decimal type, that is leading sign-floating point, leading sign-scaled, trailing sign-scaled, or no sign-scaled. SF defines the scale factor, the scale factor being treated as a power of 10 exponent where a positive number moves the scaled decimal point to the right and a negative number moves the scaled decimal point to the left. The decimal point is assumed to be immediately to the right of the least significant digit.

Figure 5:
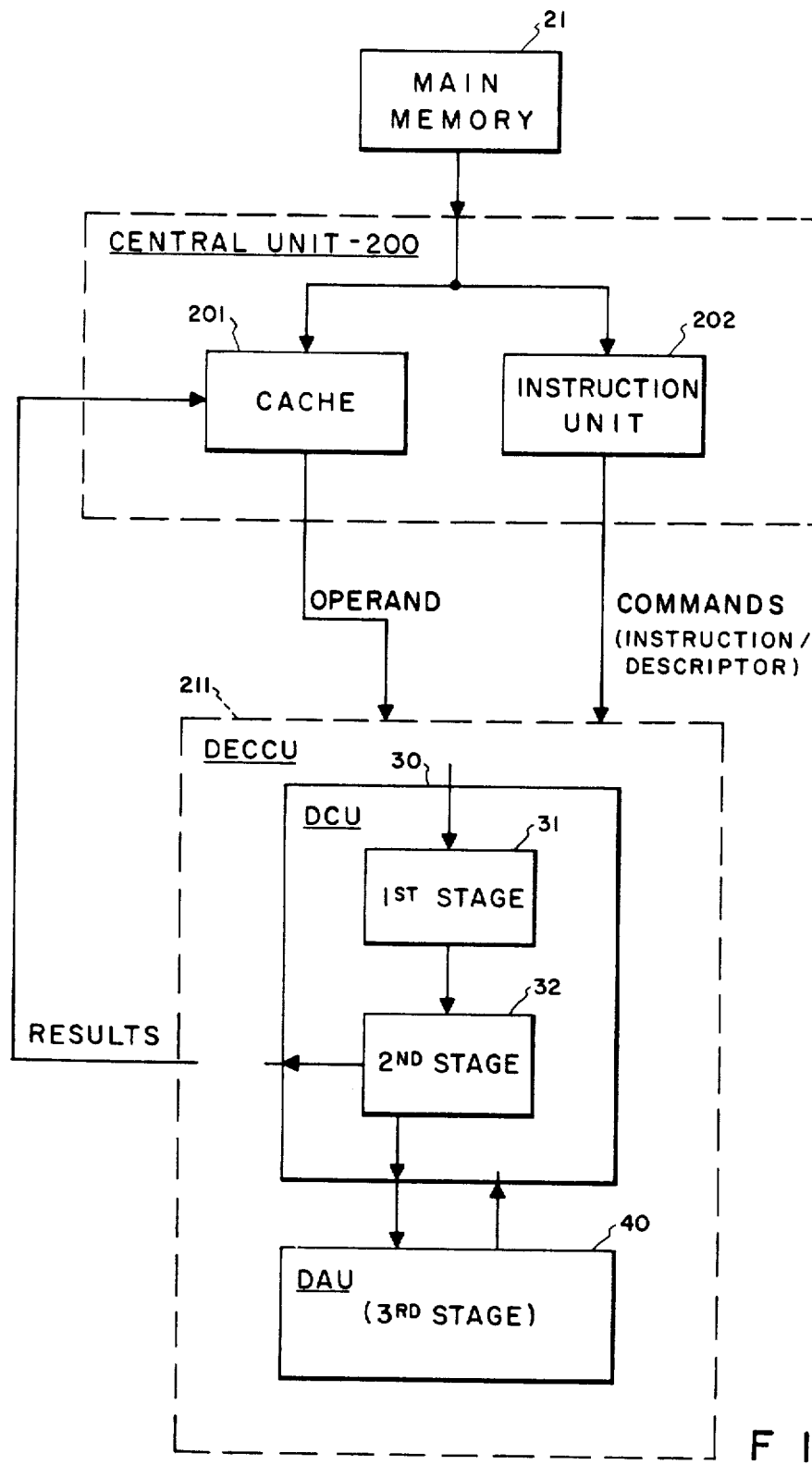
FIG. 5 shows a functional block diagram of the decimal character unit.

Referring to FIG. 5, there is shown the decimal character execution unit (DECCU) 211 in functional block diagram form. The DECCU 211 is the execution unit of the CPU 20 for a predetermined set of multiword instructions, including decimal arithmetic instructions, various character manipulation instructions, and instructions which operate on binary strings. The DECCU 211 is partitioned into two functional units, the character unit (DCU) 30 and the arithmetic unit (DAU) 40. The DCU 30 comprises two stages, a first stage 31, and a second stage 32. The DAU 40 comprises the third stage of the DECCU 211. The DECCU 211 receives operands from cache 201 and command information from instruction unit 202. The cache 201 and instruction unit 202 comprise the central unit 200 which is also operatively connected to main memory 21. Results from the DECCU 211 are transmitted to cache 201 (via the action of the collector 213 as discussed. The DCU 30 executes the character manipulation instructions including bit string instructions, and the DAU 40 executes the arithmetic instructions. The instructions executed by DECCU 211 are listed in Table 1. A complete description of each instruction is included in a Honeywell Software document entitled, "DPS 8 Assembly Instructions," copyright 1980 by Honeywell Information Systems Inc. (Order No. DH03-00), and can be referred to for more detailed information.

Figure 6:
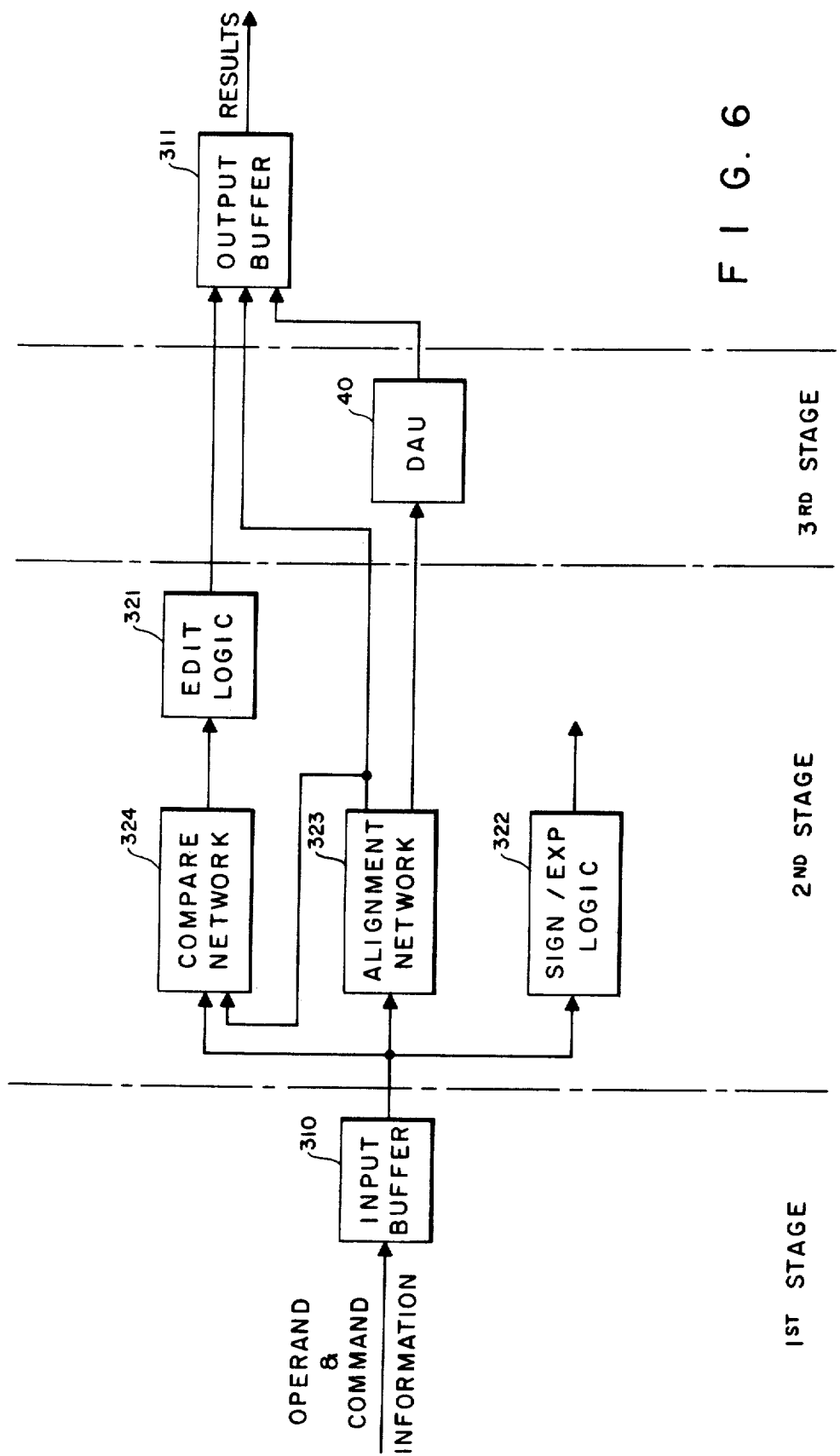
FIG. 6 shows a functional block diagram of the stages of the decimal character unit.

Referring to FIG. 6, a functional block diagram of the stages (or also referred to herein as levels) of the DECCU 211 is shown. The first stage 31 receives instruction and descriptor information from the instruction unit 202, and further receives the operand information from cache 201. The operands are stored in an input buffer 310 within the first stage 31, and the instructions are decoded and held in temporary registers and control flip flops of the first stage 31.

TABLE 1

ALPHANUMERIC
  MLR Move Alphanumeric LEFT to Right
  MRL Move Alphanumeric RIGHT to Left
  MVT Move Alphanumeric with Translation
  CMPC Compare Alphanumeric Character String
  SCD Scan Character Double
  SCDR Scan Character Double in Reverse
  TCT Test Character and Translate
  TCTR Test Character and Translate in Reverse
  SCM Scan with Mask
  SCMR Scan with Mask in Reverse
EIS NUMERIC
  MVN Move Numeric
  CMPN Compare Numeric
  AD3D Add Using Three Decimal Operands
  AD2D Add Using Two Decimal Operands
  SB3D Subtract Using Three Decimal Operands
  SB2D Subtract Using Two Decimal Operands
  MP3D Multiply Using Three Decimal Operands
  MP2D Multiply Using Two Decimal Operands
  DV3D Divide Using Three Decimal Operands
  DV2D Divide Using Two Decimal Operands
EIS BIT STRING
  CSL Combine Bit Strings Left
  CSR Combine Bit Strings Right
  SZTL Set Zero and Truncation Indicator With Bit Strings Left
  SZTR Set Zero and Truncation Indicator With Bit Strings Right
  CMPB Compare Bit Strings
EIS CONVERSION
  DTB Decimal to Binary Convert
  BTD Binary to Decimal Convert
EIS EDIT MOVE
  MVE Move Alphanumeric Edited
  MVNE Move Numeric Edited
NEW EIS MULTIWORD
  CMPCT Compare Characters and Translate
  MRF Move to Register Format
  MMF Move to Memory Format
TEN INSTRUCTIONS: EBCDIC/OVERPUNCHED SIGN CAPABILITY
  MVNX
  CMPNX
  AD3DX
  AD2DX
  SB3DX
  SB2DX
  MP3DX
  MP2DX
  DV3DX
  DV2DX
  MVNEX Move Numeric Edited Extended Second stage 32 contains edit logic 321, sign/exp logic 322, alignment network 323, and compare network 324 required to perform the character manipulation and alignment operations. The output of the second stage 32 is either the final result which is transmitted to an output buffer 311 to be stored in cache 201, or is aligned data passed to the DAU 40. The DAU 40, which comprises the third stage of the DECCU 211, performs the arithmetic operation on the aligned data (arithmetic operation may also be referred to herein as numeric execution). Each stage of the DECCU 211 will be described in detail hereinunder.

Figure 7:
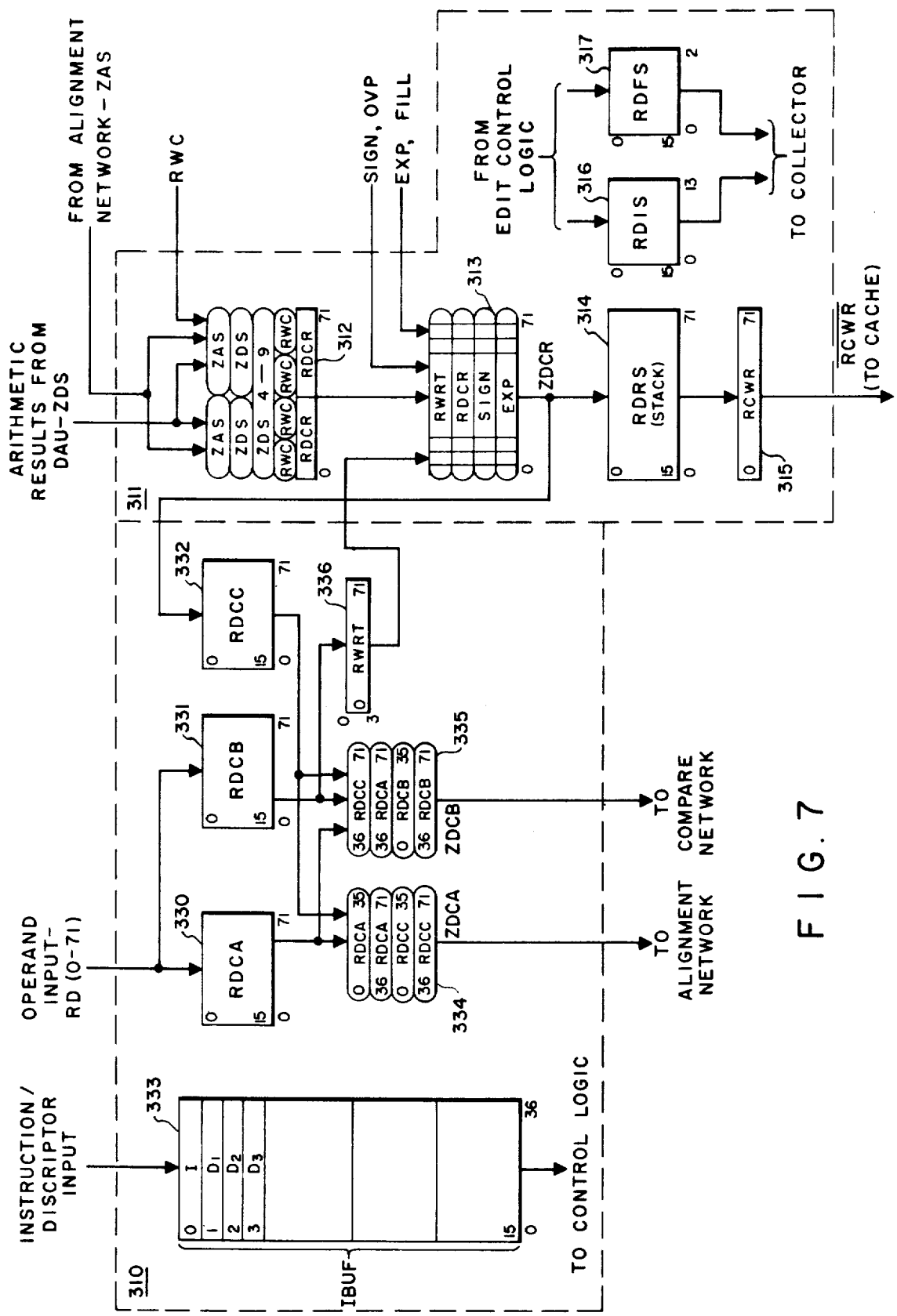
FIG. 7 shows a functional logic diagram of the input buffer and output buffer of the decimal character unit.

The input buffer 310 and output buffer 311 of the decimal character unit is shown in FIG. 7. The input buffer 310 comprises a first and second operand input stack, RDCA and RDCB 330 and 331, respectively (also referred to as stack A and stack B, respectively), a third stack RDCC 332 (also referred to as stack C), and an instruction/descriptor input buffer 333, IBUF. A first and second switch 334 and 335 (also denoted as the ZDCA and ZDCB switches, respectively) is included as part of input buffer 310. First switch 334 is operatively connected to stack A 330 and stack C 332 for transferring selected data, ZDCA, to alignment network 323. Second switch 335 is operatively connected to stack A 330, stack B 331, and stack C 332 for transferring selected data ZDCB to compare network 324. A rewrite register 336, RWRT, is operatively connected to stack B 331, the output of RWRT being connected to output buffer 311. The loading of IBUF 333, and the operand input stacks 330, 331 is from CUPS 204 and cache 201, respectively under the control of CUPS 204.

The IBUF 333 is a 16 word by 36 bit wraparound buffer. Upon receipt of an instruction available signal from CUPS 204, an instruction/descriptor word is read onto the corresponding location of IBUF 333. IBUF is organized in 4 four-word blocks, thereby capable of storing up to a maximum of four instructions at a time. The first word of the block is for storing the instruction word I, the second word of the block is for the first descriptor word D1, the third word of the block is for the second descriptor word D2 and the fourth word of the block is for the third descriptor word, if any. The information contained in the instruction/descriptor words is transferred to the various control logic for the generation of control signals to effect the execution of the functions required to execute the instruction. An IBUF-full control signal is sent to CUPS 204 when IBUF 333 is full. The format of the instruction/descriptor words and the significant control signals are described in the related patent application, paragraph (4) identified above and incorporated by reference herein.

Operand input data (also denoted by signal name RD) is loaded into stack A 330 and stack B 331 as a function of the instruction. In the preferred embodiment, stack A 330 and stack B 331 are each 16 word×72-bit memory devices. Double word writes are made into the operand stacks 330, 331 and can hold operands awaiting execution for a maximum of 4 instructions. When the DECCU 211 receives a control signal from CUPS 204 indicating operands are available, the operands are fetched by doubleword reads. The input operands are loaded into stacks A and B 330, 331 according to steering control signals. An operand full control signal is transmitted to the CUPS 204 from the DECCU 211 when either operand stack is full. A stack full signal from stack A 330 and a stack full signal from stack B 331 is ORed to generate the operand full control signal to CUPS 204. Operand 1 data is loaded into stack A 330, and operand 2 data is loaded into stack B 331 for character type instructions. Operand 1 and operand 2 data are loaded into stack A 330 for numeric-type instructions (instructions sometimes being referred to as operations or OPS). Rewrite data and translated data are loaded into stack B 331. The loading of the operands into the operand stacks is selected according to the instructions as shown in Table 2.

TABLE 2

| DECCU Instruction | Stack A RDCA | Stack B RDCB |
|---|---|---|
| MLR,MRL | OP1 | OP2 |
| MRF,MMF | OP1 | — |
| MVT | OP1 | OP2,OP3 |
| MVE,MVNE | OP1 | OP2,OP3 |
| TCT,TCTR | OP1 | OP2 |
| SCM,SCD | OP1 | OP2 |
| CMPC | OP1 | OP2 |
| CMPCT | OP1 | OP2,OP3 |
| CSL,CMPB,SZTL | OP1 | OP2 |
| DTB | OP1,OP2 | — |
| BTD | OP1 | OP2 |
| MVN | OP1,OP2 | OP2 |
| AD2D,MP2D | OP1,OP2 | OP2 |
| AD3D,MP3D | OP1,OP2 | OP3 |
| CMPN | OP1,OP2 | — |
| LPL,SPL | OP1 | — |

Operand data can be read from stack A 330 a double word at a time if it is to be packed 9-bit to 4-bit. This can occur with unpacked numeric operands and the MLR and MRL instructions. Otherwise the operand data is read on a single word basis. Operands from stack B 331 are single word reads. Rewrite data from stack B 333 is loaded into the RWRT (the rewrite register) 336 by a double word read. It can be seen that either a double word can be selected from stack A 330 or two single words from stack A 330 and B 331 by the ZDCA and ZDCB switches 334, 335, but not both.

DECCU numeric results are stored in stack 332 as well as result stack RDRS (the result stack will be described in detail hereinunder in conjunction with the output buffer 331) in case the result is to be one of the input operands for a numeric instruction immediately following. The normal operand fetches for that operand are cancelled, and that operand is read instead from stack C 332 thereby eliminating the delay introduced by a store-load break. Wraparound data from stack C 332 can be read on either a double word or single word basis just as if the operand were in stack A 330. The selected operand data, ZDCA and ZDCB, are sent to the alignment network 323 for alignment, to the compare network 324 for character comparison and selection, and to the sign/exp logic 322 to extract signs and exponents.

The control logic (not shown) generates the read and write addresses for the stack A 330, stack B 331, and stack C 332. The control logic also generates the select controls for the ZDCA and ZDCB switches 334, 335. In addition, the control logic generates data available signals that allow the input registers of the alignment network 323 and the compare network 324 to be loaded. The control logic signals the CUPS 204 when ten or more locations in either stack A 330 or stack B 331 are used to prevent writing over good data.

The output buffer 311 comprises a 1-of-4 select double word register 312 (more simply referred to as the RDCR register), having inputs ZDS, arithmetric results from DAU 40, ZAS from alignment network 323, and resultant output from edit logic 321 (RWC register to be discussed hereinunder). An output buffer select switch 313 (or more simply referred to as ZDCR switch) receives inputs from RDCR register 312, RWRT register 336, the sign, OVP data from sign/exp logic 322, and the EXP, FILL data from compare network 324. The data selected by the ZDCR switch 313 is stored in a results stack RDRS 314. The results stack RDRS 314 is a 16 word by 72 bit memory device or stack. The results stack 314 stores data to be stored in cache 201 via a RCWR register 315. The output buffer 311 also includes an indicator results stack 316 and a fault results stack 317. Indicator results stack 316 is a 14 bit × 15 high stack, and fault results stack 317 is a 3 bit × 15 high stack. Inputs are received from edit control logic and output results are transferred to the collector 213.

Figure 8:
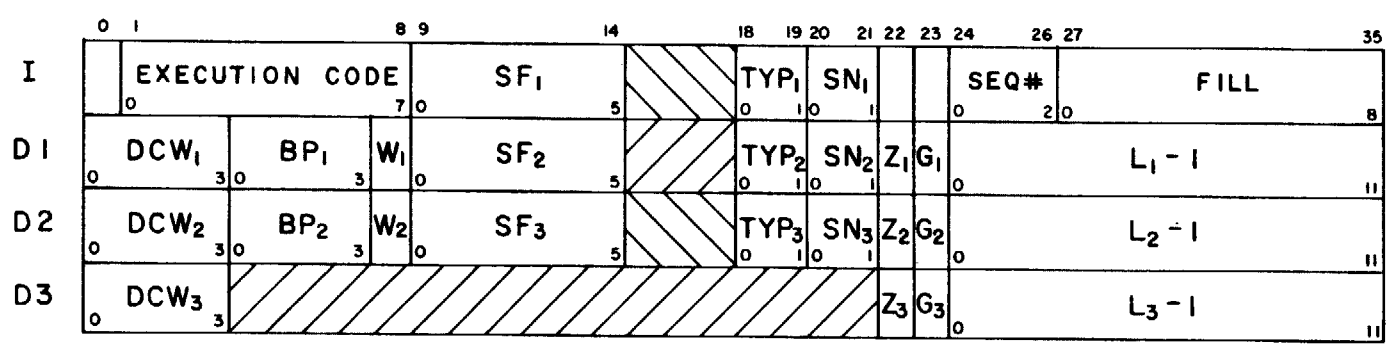

The format of the DECCU instruction/descriptor words is shown in FIG. 8. The words are generated by the CUPS 204 in the format shown. The instruction word includes the scale factor and sign information of the first operand. This format is important from timing considerations which will be described in detail hereinunder. SF, indicates scale factor for numeric operands. TYP identifies the data type as follows: 00 for 9-bit format, 01 for 6-bit data, and 10 for 4-bit data. SN indicates sign and decimal type for numerics. SEQ# indicates a sequence number and FILL is the fill character field. DCW indicates position within double word of first character, BP indicates position within first byte of first bit, and W indicates this operand is in stack C 332. Ln indicates the length of operand n, Zn is set if LN is zero, and Gn is set if Ln is greater than 256.

Figure 9:
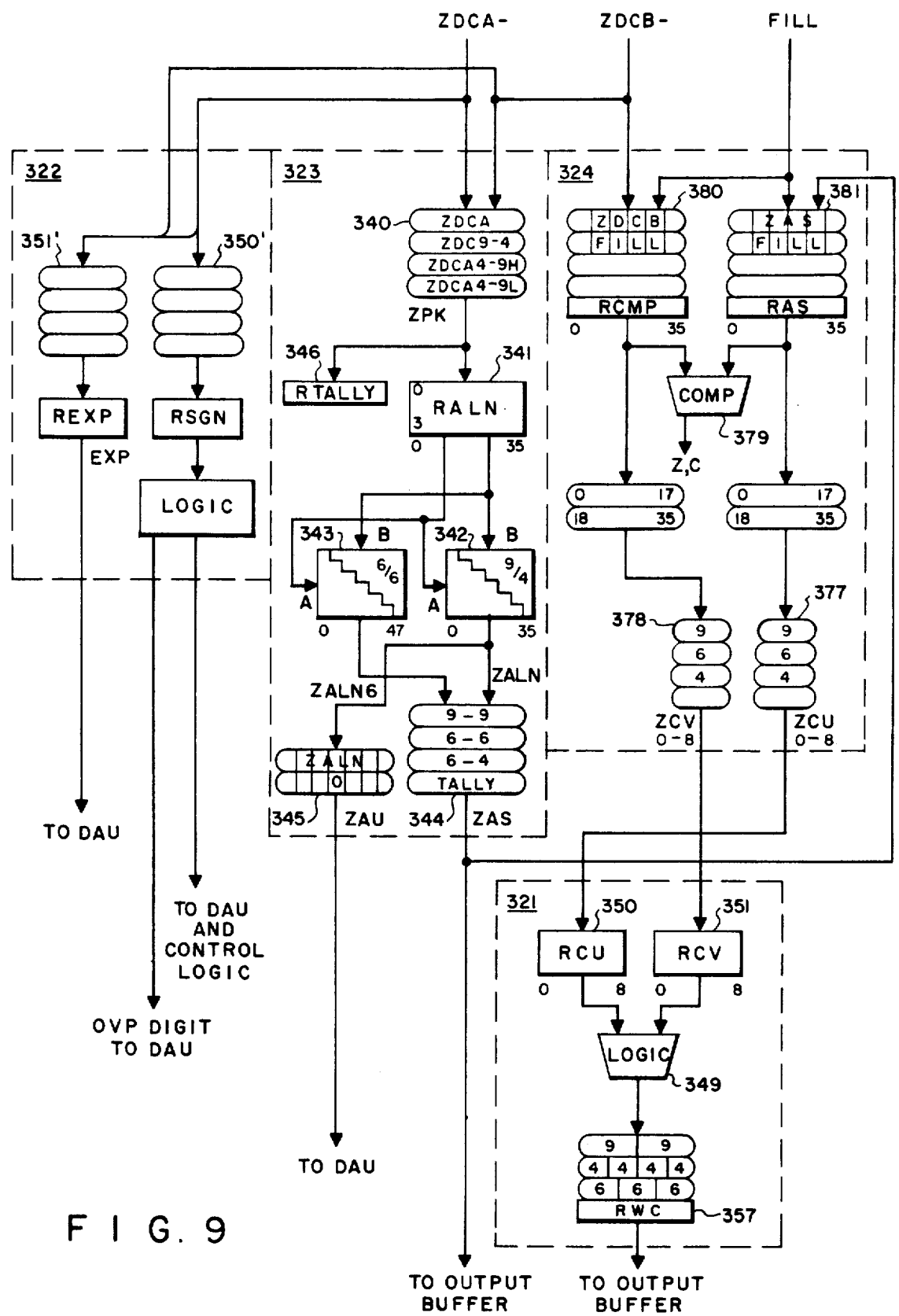
FIG. 9 shows a system logic diagram of the second stage of the decimal character unit.

A system logic diagram of the second stage of DECCU 211 is shown in FIG. 9. The second stage, the execution stage for character-type instructions, comprises the alignment network 323, compare network 324, sign/exp logic 322, and edit logic 321. The second stage receives operand input data ZDCA and ZDCB via first stage ZDCA switch 334 and ZDCB switch 335. More specifically, operand input data ZDCA and ZCDB is inputted to an input alignment switch 340 (or more simply denoted the ZPK switch) of the alignment network 323, and an input sign switch 350' and an input exponent switch 351' of sign/exp logic 322. Input operand data ZDCB is inputted to a first 1-of-4 select register 380 (or more simply denoted the RCMP register) of compare network 324. The FILL character data is inputted (from a register of the control logic (not shown) which contains the FILL character data for the instruction being executed, which is included in the instruction word, or I word) to a second 1-of-4 select register 381 (or more simply denoted the RAS register) of compare network 324 and the first 1-of-4 select register 380. The output of the second stage is either the final result of an operation which is transmitted to the output buffer 311, or is aligned data transmitted to the DAU 40 for an arithmetic operation.

The alignment network 323 comprises the ZPK switch 340 operatively coupled to an alignment register 341 (or more simply the RALN register). The RALN register is coupled to a 9/4 shift network 342 and a 6/6 shift network 343. The 9/4 shift network 342 and the 6/6 shift network 343 are in turn coupled to a first alignment output switch 344 (or more simply the ZAS switch), and a second alignment output switch 345 (or more simply the ZAU switch). A register, RTALLY 346, is utilized to maintain a tally count which will be described further hereinunder.

Compare network 324 includes the RCMP register 380 and the RAS register 381 for storing operand 1 (OP1) and operand 2 (OP2). A comparator 379 is included which compares OP1 to OP2 and outputs a zero and carry signal (Z and C). The OP1 and OP2 data are passed to respective output switches 377 and 378, denoted ZCU switch and ZCV switch, respectively.

The edit logic 321 receives the ZCV and ZCU data into respective RCV register 351 and RCU register 350. The data is combined by logic 349 to operate on the data to effect execution of the instruction. The data is then formatted in results register 357 RWC and transferred to the output buffer 311. The sign/exp logic 321 provides the logic for extracting the sign and exponent. A more detailed description of the logic of the second stage of the DECCU 211 is provided in the application of Related Patent Applications, Par. (4).

Figure 10:
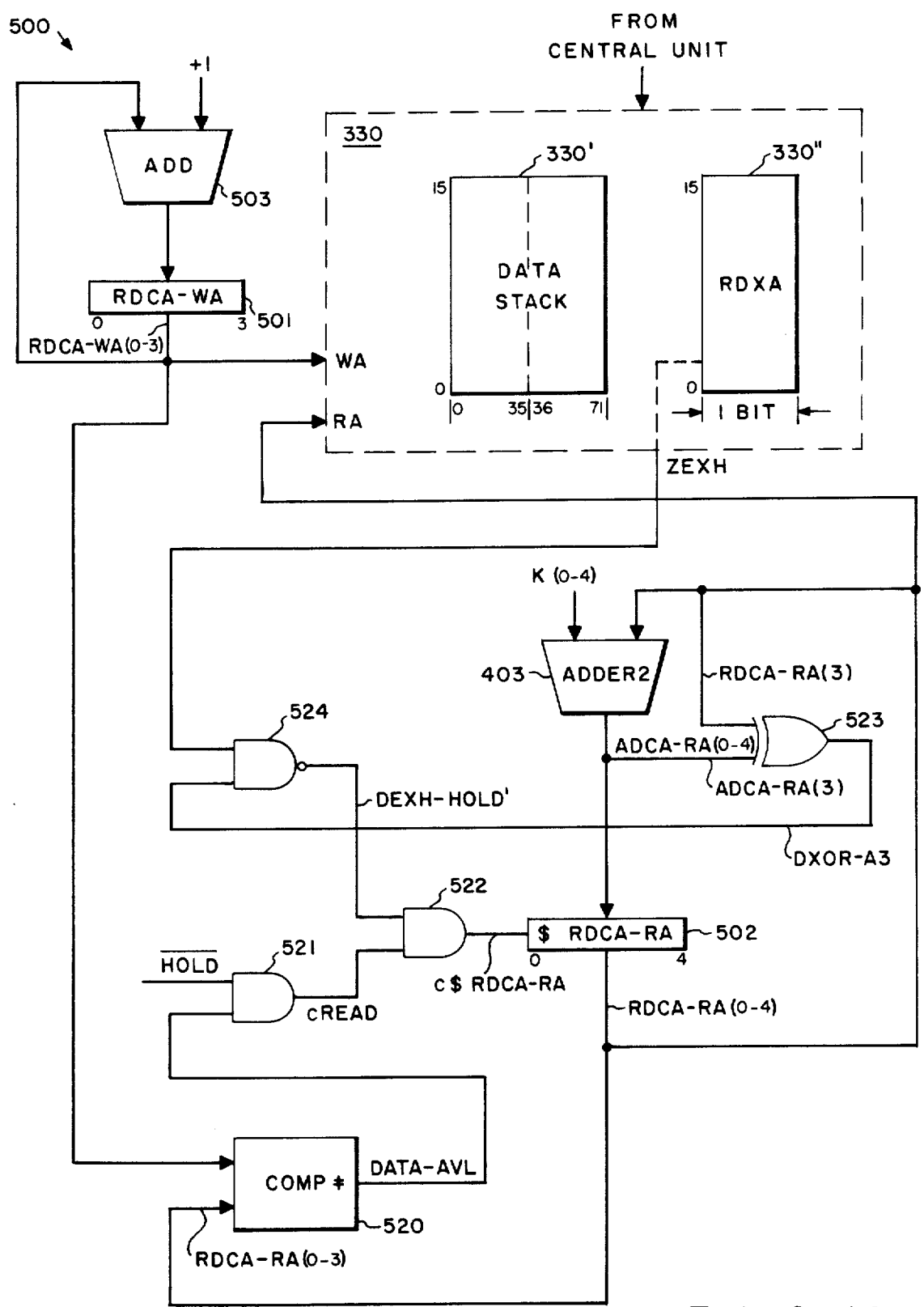
FIG. 10 shows a block diagram of the preferred embodiment of the data available indicator apparatus of the present invention.

The control logic of the present invention will now be described. Referring to FIG. 10, there is included a block diagram of the preferred embodiment of the present invention. The first operand input stack 330 (stack A) stores operand data. Stack A, 330 in addition to including a data stack 330', also includes a control stack RDXA 330". The data stack A 330' of the preferred embodiment is a 16 high×72 bit stack and the control stack RDXA 330" is a 16 high×1 bit stack. As mentioned above, the computer word of the preferred embodiment is a 36-bit word. Therefore, each addressable location of th data stack A 330' is a double word. Each addressable location of data stack 330' has associated therewith, a corresponding control bit from control stack RDXA 330". The data stack A 330' is divided into an even and odd half, each half storing single computer words, bits 0–35 define the even half of the stack and bits 36–71 define the odd half of the stack. Control logic 500, which controls the reading and writing of operand data into stack A 330, includes the data available indicator logic of the present invention. Control logic 500, includes a write address register (RDCA-WA) 501 and a read address register (RDCA-RA) 502, both registers being operatively connected to stack A 330. Operand data from the central unit 200 is stored into sequential locations of Stack A 330 indicated by a write address value stored in the write address register RDCA-WA 501, the write address value denoted herein as the write address pointer (WA or WA pointer), and the write address value being incremented by one by an adder ADD 503. The first write address value of a set of data is also a starting address value for that data set, and is stored in a starting address register (RDCA-SA) (not shown). The starting address register (not shown) is more fully described in related application of par. (7) incorporated by reference herein. (The numbers in the parenthesis of FIG. 10 indicate the bits, e.g., 0–3 references bits 0 through 3).

During a reading of the operand data from stack A, the read address register 502 is initially loaded with a starting address value from the staring address register (not shown, but more fully described in related application of par. (7)). After the first operand data word has been read, the read address value (RDCA-RA)$_{(0-4)}$ is incremented by a constant, $K_{(0-4)}$, in ADDER2 403 to obtain the next sequential word, the output of the ADDER2 403 being the next sequential address value (ADCA-RA$_{(0-4)}$) which is coupled to the read address register 502. The constant utilized by the ADDER2 403 has a predetermined value depending upon the type of read. For a single word read a value of 1 binary is inputted to ADDER 2 403, a double word read utilizes a constant value of 2 binary, and single word reverse reads vary the constant from +3 to −1 on alternate cycles, the effect of the constant upon the type of read being more fully described in the related patent application par. (7).

When the location address value (RDCA-RA$_{0-3}$), RA pointer or read address pointer) is equal to the write address pointer no data is available in stack A 330. The read address pointer and the write address pointer (RDCA-WA$_{(0-3)}$) are coupled to a comparator COMP 520. The not equal output of the comparator 520 provides a data available signal (DATA-AVL). Therefore, the DATA-AVL signal provides a signal which is intended to partially enable the read address register 502. DATA-AVL is coupled to a first AND gate 521. A second input to AND gate 521 is a $\overline{\text{HOLD}}$ signal (a system hold) for further enabling AND gate 521. Therefore, if there are no system holds, and data is available, the output of AND gate 521 provides an enabling signal (cREAD) to a second AND gate 522.

An exclusive OR gate 523 has a first input, (RDCA-RA$_{(3)}$), coupled to the bit 3 output of read address register 502, and a second input, (ADCA-RA$_{(3)}$), coupled to the bit 3 output of ADDER2 403, for comparing the respective bit 3 values. The output of the exclusive OR gate 523 is coupled to a first input of a NAND gate 524. When the respective bit 3 values are unequal, an output signal of exclusive OR gate 523, DXOR-A3, is provided (i.e., DXOR-A3 is a logic 1, or high, partially enabling NAND gate 524.) For double word reads, DXOR-A3 will always be high. For single word reads, exclusive OR gate 523 functions to insure that a complete read of the data is performed, and will be described further hereinunder.

As described above, each location of data stack A 330' has associated therewith a bit in control stack RDXA 330". If the operand word stored in the data stack 330' is not the last word in the string, the corresponding location of RDXA 330" contains a binary 0 value, or logic 0. Conversely, if the word stored in the data stack 330" is the last word of the string, a binary 1 value or logic 1 is stored in that location. For each read of a data word from data stack A 330', there is read the corresponding bit, ZEXH, which is coupled to a second input of NAND gate 524. For operand data words which are not the last word, ZEXH is a logic 0. The output of NAND gate 524 is coupled to a second input of AND gate 522. Hence, when ZEXH is a logic 0, the output of NAND gate 524 is a logic 1, thereby completely enabling AND gate 522. The output of AND gate 522, which is coupled to an input of read address register 502 which serves to enable strobing of the read address register 502, provides a control signal, C$RDCA-RA, at a logic 1 level thereby allowing the contents of the read address register 502 to be updated. When the last operand data word is read, ZEXH will be at a logic 1, and DEXH-HOLD' (the output signal of NAND gate 524) will be a logic 0 disabling AND gate 522. Hence, the output signal C$RDCA-RA of AND gate 522 will be at a logic 0 disabling the read address register strobe input, thereby inhibiting the update of the read address value stored in the read address register 502.

Figure 11:
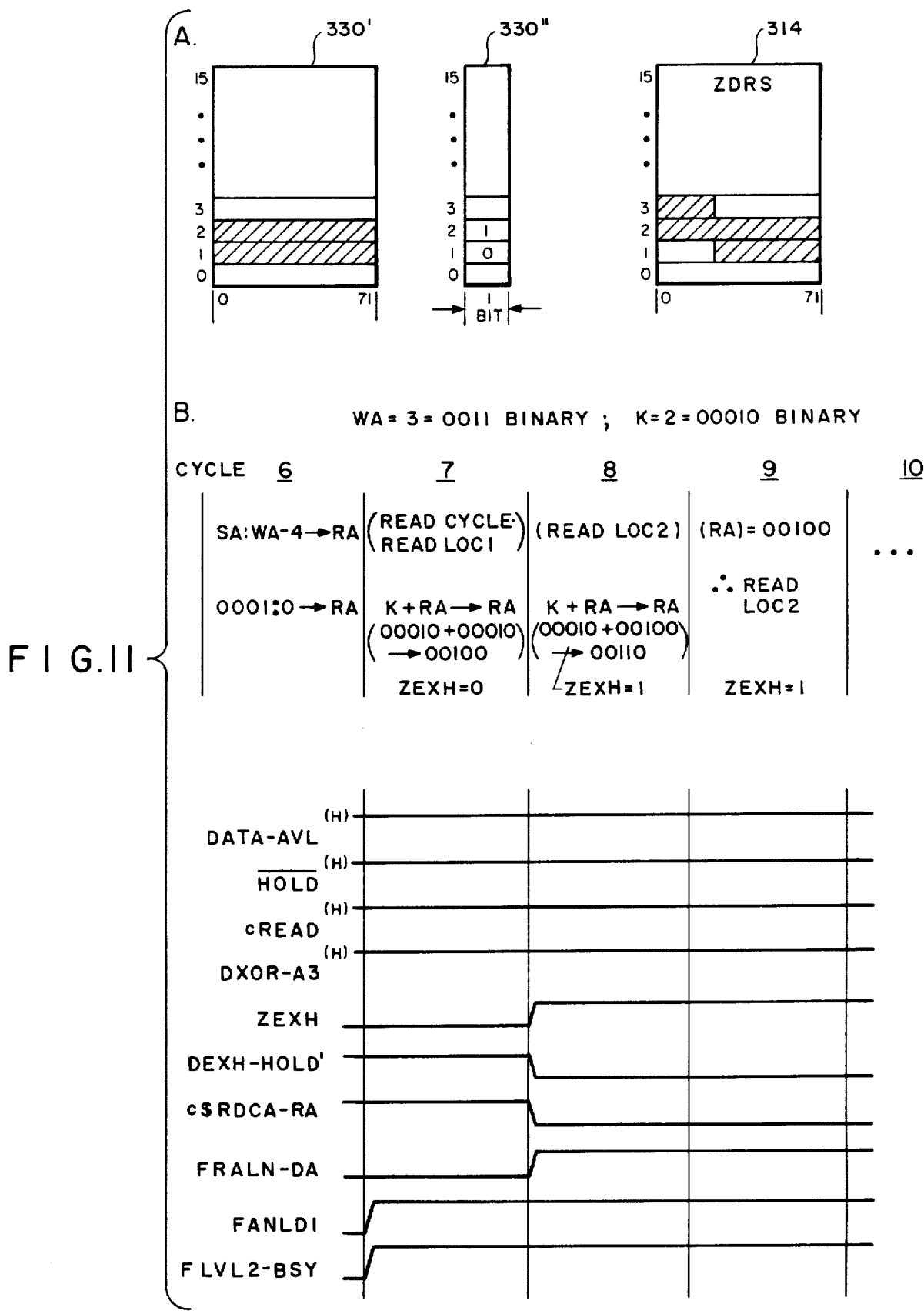
FIG. 11 shows a timing diagram of the steps performed in the overall operation of the present invention for detecting the end of the data string and inhibiting the updating of the read address register.

The operation of the present invention will now be described in conjunction with FIG. 11. FIG. 11 shows a timing diagram of the steps performed in the overall operation of the present invention for inhibiting the updating of the read address register 502. For purposes of example, and in no way intended to limit the present invention, assume that locations 1 and 2 of data stack 330' contain operand data desired to be read (double word reads are to be performed), as shown in FIG. 11A. Hence, in this example, the WA pointer has a value of 0011 binary, the starting address has a value of 1 (0001 binary), and the constant for double word reads has a value of 2 (00010 binary). Also, location 1 of the control stack RDXA 330" has a logic 0 stored therein, and location 2 of RDXA 330" has a logic 1 stored therein since location 2 of the data stack 330' has the last word of the operand data string. If a move right operation is to be performed, then the remaining data will require three words to be stored in the result stack 314, as shown by the cross-hatched area.

Referring to FIG. 11B, the reading of the operand data is shown to be initiated during cycle 6. During cycle 6, the read address register 502 is loaded with the start address value concantenated with the WA-4 signal (the WA-4 signal indicates the odd/even half of the data stack as more fully described in the related application par. (7).)

At the start of cycle 7, a read cycle is initiated which reads location 1 of stack A 330. Location 1 of stack A is read since the read address value contained in the read address register 502 has a value of 1. Location 1 of the control stack RDXA 330" is also read. Thus, signal ZEXH =0 (or low). Also, during cycle 7, the read address register 502 is updated. The constant (00010 binary) is added to the current value of the read address register 502 (00010 binary) and the result (00100 binary) is loaded into the read address register 502 for the next read on the next sequential cycle.

Since the WA pointer has a value of 3 and the RA pointer has a value of 1, the signal DATA-AVL is high. Since the data has been loaded prior to the start of the read, DATA-AVL will be high through all the cycles of this example. This signal is significant when the operand data is being read from stack A 330 while the operand data is still being loaded. This example assumes no system holds occur during the example and thus, $\overline{\text{HOLD}}$ will be high through all the cycles of this example. Since the two inputs to AND gate 521 are high, the output, READ, will be high partially enabling, or partially qualifying, AND-gate 522. As stated above, DXOR-A3 will also be high during double word reads. Since DXOR-A3 is high, ZEXH will control, and since ZEXH is low during cycle 7, DEXH-HOLD' will be high and c$RDCA-RA will be high, thereby enabling read address register 502 to be updated with the value just computed during cycle 7. FANLD1, the control signal for the operand 1 load gate into the alignment register RALN 341 goes high allowing the operand data just read to be loaded into RALN 341.

At the start of cycle 8, the operand data at location 2 is read and stored into RALN 341. Location 2 of control stack RDXA 330" is also read, and since the bit value at location 2 is a logic 1, ZEXH goes high at the start of cycle 8. The contents of the read address regiter 502 is added to the constant during cycle 8 but since ZEXH is high, DEXH-HOLD' goes low, causing c$RDCA-RA to go low, thereby inhibiting the read address register 502 from being updated. The read address value stored in the read address register 502 at the end of cycle 7 contained a value of 2 (00100 binary) and remains thus. A control flip-flop (not shown), outputs a control signal FRALN-DA, which indicates data is available in the alignment register 341, and therefore goes high at the start of cycle 8.

During cycle 9, location 2 is read again, resulting in the ZEXH signal being held at a logic 1. The value in the read address register 502 is inhibited from being updated, permitting the additional cycle (or cycles) to occur to complete the instruction and without reading data from stack A 330 which is associated with a subsequent instruction.

Cycles 1 through 5 are utilized by the central unit 200 to fetch and decode the instruction as explained in detail in related application, noted in paragraph (4) above. The control signal FLVL2-BSY indicates the second stage of the DECCU 211 is busy. It was assumed in the above example that the stack A 330 has been loaded sometime prior to cycle 6.

Figure 12:
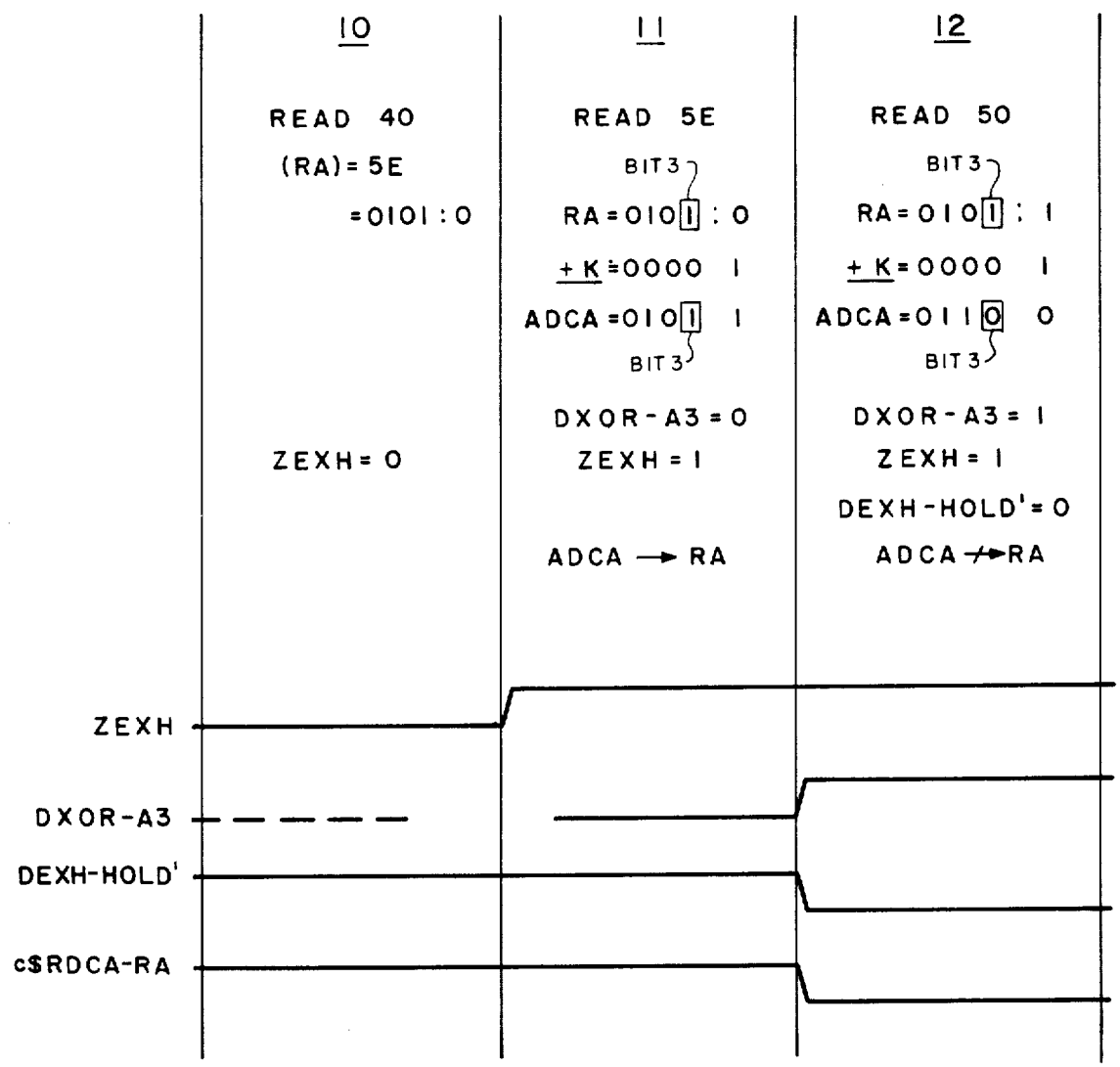
FIG. 12 shows a timing diagram of the steps performed in the operation of the present invention for single word operand data reads.

As mentioned above, single word reads of the operand data from stack A 330 can be performed utilizing a constant of +1 as more fully described in related patent application of paragraph 7. The operation of the present invention during single word reads will now be described. FIG. 12 shows a timing diagram of the steps performed in the overall operation of the present invention for detecting the end of the data string and inhibiting the updating of the read address register for single word reads. Referring to FIG. 12, it is assumed, for purposes of example, that data reads have been in progress during previous cycles, and during cycle 10, word 4, the odd half of data stack 330', is read. As discussed above, the read address register is updated such that the contents of the read address register 502 will indicate the even half of data stack 330', location 5, resulting in a value of 01010 binary. It is assumed, in this example, that word 4 is not the last word of the operand data string and hence ZEXH will be a zero. In this example, it will be assumed that word 5 is the last word of the operand data string; hence, the bit in the control stack RDXA 330", location 5, will have a logic one.

During cycle 11, location 5 E (the even half of data stack 330') will be read. As described above, the contents of the read address register 502 will be updated by a constant, in this case a value of +1 since single word reads are being performed. The contents of the read address register 502 prior to the update is 01010 binary. The resulting sum, the ADCA value, will be a 01011 binary. Exclusive OR-gate 523 compares bit 3 of the 2 values, i.e., ADCA and RDCA, both values being a binary one, and hence the output of exclusive OR-gate 523 (DXOR-A3) will be a zero. Since location 5 is the last word of the operand data string, ZEXH will be a logic one. However, since DXOR-A3 is a logic zero, the output of NAND gate 524 (DEXH-HOLD') will be a logic one, thus enabling AND gate 522 and hence enabling the strobe input of read address register 502, allowing the ADCA value to update the read address register 502.

During cycle 12, location 5-odd will be read from data stack 330'. Once again, the value contained in the read address register 502 will be incremented by the value of K resulting in the output ADCA, the resulting output having a value of 01100. In this case, bit 3 of the resulting ADCA output will be a binary zero, and bit 3 of the read address register 502 will be a binary one. Hence, the output (DXOR-A3) of exclusive OR-gate 523 will be a logic one. In this case, since ZEXH is a logic one, the output DEXH-HOLD' of NAND gate 524 will be a logic zero disabling AND gate 522 and further disabling the strobe input of the read address register 502, inhibiting the resulting ADCA value calculated during cycle 12 from updating the read address register 502.

By following the principles outlined above, it will be readily apparent to one skilled in the art that the present invention will perform its intended function for reverse reading of operand data.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a data processor, which executes a predetermined instruction on a predetermined operand as indicated by an instruction word, said operand being a variable length data string made up of at least one computer word, the execution of the instruction being performed by said data processor in a sequential series of steps wherein at least one step is performed in a predetermined time period, said time period being a cycle of said data processor, and wherein at least one cycle is required to read said operand stored in a memory device of said data processor, said memory device having a plurality of addressable locations, said variable length data string being temporarily stored in at least one addressable location of said memory device, said data processor further including an apparatus for providing a control signal to indicate the end of the variable length data string thus inhibiting further reads of the variable length data string without inhibiting the subsequent steps of the cycles associated with the execution of the instruction thereby allowing the execution of the instruction to complete, said apparatus comprising:

(a) memory means, having a plurality of addressable locations, each of said plurality of addressable locations corresponding to a respective addressable location of said memory device, for storing information to generate said control signal when the stored information indicates the corresponding addressable location of the memory device is the last computer word of the variable length data string; and (b) register means for temporarily storing a read address value, said register means having an input terminal adapted to receive the read address value, the read address value corresponding to an addressable location of said memory device containing the computer word of the variable length data string to be read in the execution of the instruction, said register means further having a strobe input terminal operatively connected to said memory means whereby said control signal is operatively coupled to said register means to control the loading of an updated read address value into said register means in response to said control signal.

2. An apparatus, according to claim 1, further comprising:

(a) adder means, operatively connected to the input terminal of said register means, and operatively connected to an output of said register means, for updating the read address value by a preselected constant to generate said updated read address value;

(b) first compare means, having a first and second input operatively connected to the input and output of said register means, respectively, for comparing a preselected bit of said updated read address value to a preselected bit of said read address value, to generate an enable signal indicating more computer words are to be read; and (c) first gate means, for combining the information of said memory means, corresponding to the computer word read, and said enable signal to generate said control signal when either of said inputs combined by said first gate means indicates more computer words are available to be read.

3. An apparatus, according to claim 2, further comprising:

(a) second compare means, operatively connected to the output of said register means, and having an input adapted to receive a write address value, for comparing said write address value to said read address value to generate a data available signal indicating more computer words are available in said memory device; and (b) second gate means for qualifying said control signal with said data available signal.

4. An apparatus, according to claim 3, further comprising:

(a) third gate means for further qualifying said control signal and said data available signal with a hold signal indicating the lack of a system hold.

* * * * *